United States Patent [19]

Fiorda

[11] Patent Number: 4,945,369
[45] Date of Patent: Jul. 31, 1990

[54] FILM MAGAZINE FOR UNDERWATER CAMERAS

[76] Inventor: John H. Fiorda, 3074 Van Buren Ave., Costa Mesa, Calif. 92626

[21] Appl. No.: 389,253

[22] Filed: Aug. 2, 1989

[51] Int. Cl.⁵ .......................... G03B 1/12; G03B 1/66; G03B 13/02; G03B 17/26
[52] U.S. Cl. .................................. 354/173.1; 354/174; 354/217; 354/219; 354/275; 354/288
[58] Field of Search ..................... 354/173.1, 174, 275, 354/288, 217, 219

[56] References Cited
U.S. PATENT DOCUMENTS
3,748,986  7/1973  Kimura et al. ................. 354/173.1

Primary Examiner—Michael L. Gellner
Attorney, Agent, or Firm—Roy A. Ekstrand

[57] ABSTRACT

A film magazine for underwater cameras includes an outer housing attachable to an underwater camera. A seal is provided which seals the junction of the camera and film magazine. A pair of extended capacity film cannisters are supported within a film housing which in turn is received within the outer housing. A drive motor is operative upon the take-up film cannister and is controlled by a pivotal sensing lever which responds to film slack during the film transport operation of the camera.

7 Claims, 3 Drawing Sheets

FILM MAGAZINE FOR UNDERWATER CAMERAS

FIELD OF THE INVENTION

This invention relates generally to cameras and film magazines used therein and particularly to those cameras used in underwater photography.

BACKGROUND OF THE INVENTION

Through the years a number of cameras have been developed for use in underwater photography. While the structural details and design aspects of such cameras have exhibited substantial variation, all generally include a camera body and lens and sealed environment. The sealed environment may comprise a separate sealed compartment within which the camera is supported and through which the lens has access to the underwater environment or, as is more common, the camera body itself and lens support may include integral seal mechanisms for protecting the interior of the camera. In addition, most underwater cameras are structured with reinforcement and additional strength to sustain the increased pressures found in operating underwater.

Perhaps one of the most popular types of underwater cameras used today comprises a thirty-five millimeter single lens reflex camera adapted for use underwater. One such camera is that presently manufactured by Nikon Corporation known under the brand name Nikonos. In basic features, the underwater thirty-five millimeter cameras very much resemble their above the water counterparts in that the camera body defines a generally rectangular elongated housing supporting a viewing aperture and having an internal prism for through the lens viewing. The lens generally extends forwardly through the front generally center portion of the camera body. Means are provided for winding and advancing the film as well as adjusting the focus and tripping the shutter. In the case of the underwater version of such cameras, the entire mechanism including all controls are sealed to protect the camera interior. The underwater thirty-five millimeter cameras generally used today also resemble their above the water counterparts in that they typically are limited to a maximum film size of thirty-six exposure film rolls.

Once the film within the underwater camera has been exposed, the camera must be returned to the surface to accomplish the reloading function. Once the camera is carefully dried, the back portion is removed to provide access to the film. The seal mechanism must be opened or broken to accomplish this access and as a result the seals must then be cleaned and their protective coatings (usually grease-type sealants). With the seals cleaned, serviced and relubricated, the camera is reloaded with fresh film and carefully reassembled to its sealed condition.

Because the reloading function of the underwater camera involves considerable effort and requires return trips to and from the surface for the diver, substantial limitations on the effectiveness of underwater photography operations is experienced due to the limited capacity of the underwater cameras. This wasted time is particularly critical in underwater photographic operations conducted in critical light conditions as are frequently found in underwater filming environments. To meet the problems and limitations imposed upon underwater photographic operations by limited film capacity of cameras, photographers typically load a plurality of cameras in one sitting above the surface and transport these multiple preloaded cameras down to the divers for their use. As each camera is exhausted, the diver simply switches to the next freshly loaded camera. While the use of multiple cameras provides some relief from the limitations imposed upon the operations by the limited capacity of underwater cameras, multiple camera use is expensive and cumbersome. In addition, the switching of cameras while more convenient than a trip to the surface, still imposes a substantial interruption for the diver in that the cameras must be interchanged and the focusing and various other settings of the camera must be redone with each new camera.

There remains, therefore, a need in the art for a system which increases the capacity of underwater cameras without imposing the burdens and expenses realized by use of multiple preloaded cameras.

SUMMARY OF THE INVENTION

Accordingly, it is a general object of the present invention to provide an improved film magazine for underwater cameras. It is a more particular object of the present invention to provide an improved film magazine for underwater cameras having increased capacity for extended underwater film operations.

In accordance with the present invention, there is provided a film magazine for underwater cameras having a housing adapted to be received upon and mated to an underwater camera in a sealing attachment. A pair of film cannisters within the housing are rotatably supported and function as supply and take-up cannisters. Means are provided for feeding the film from the supply cannister to the take-up cannister in a manner permitting interaction of the film with the underwater camera to sequentially expose film in the conventional photographic process. Motor drive means and sensing means are operative to maintain the proper take-up of film between the two cannisters as film exposures take place.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
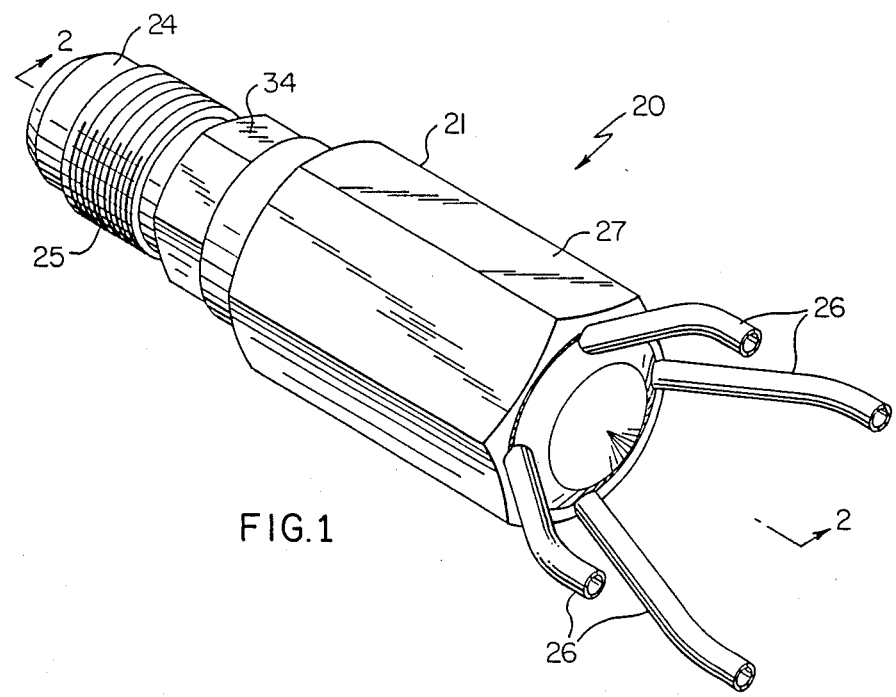
FIG. 1 sets forth a perspective view of an underwater camera and the present invention film magazine in the open position.

FIG. 1 sets forth a perspective view of the present invention film magazine generally referenced by numeral 30 in combination with a typical underwater camera generally referenced by numeral 10. Camera 10 is of conventional construction having a generally elongated rectangular shaped body 11 defining an interior film roll compartment 23 at one end and a film take-up roll compartment 25 at the other end. Camera body 11 further supports a view finder 13 having an eyepiece 19 and supporting a flash attachment bracket 14. A lens 12 is supported upon the front surface of camera body 11 and includes an outwardly extending focus adjustment knob 22. A film winder 21, also constructed in accordance with conventional fabrication techniques, extends into film roll compartment 23 and is adapted to engage a standard thirty-five millimeter film roll. A film advance lever 15 is pivotally secured to body 11 and in accordance with general fabrication techniques is operative in a pivotal motion to advance film from film roll compartment 23 to film take-up roll compartment 25 when a standard thirty-five millimeter film roll is loaded into camera 10. A shutter button 20 is coupled to standard shutter exposure means within camera 10 (not shown) which provides exposure of the film within camera 10. In accordance with conventional single lens reflex camera fabrication techniques, viewer 13 includes means for coupling eyepiece 19 through lens 12 to permit through the lens viewing of the to-be-photographed scene. It should be understood that camera 10 is entirely conventional in construction and includes all the conventional operating mechanisms utilized and typical in single lens reflex cameras. A film pressure plate 24 is supported between compartments 23 and 25 and maintains the proper position of film with respect to lens 12 during the photographic process. In addition to the above-described features typical of single lens reflex cameras in general, camera body 11 further defines an outwardly extending seal edge 38 and a hinge 37. In its general fabrication, camera 10 would further include a camera back having hinge means secured to hinge 37 and having seal means cooperating with seal edge 38 to complete the closure of camera body 11 in a sealing manner once film is loaded into film roll compartment 23 and transported beneath pressure plate 24.

In accordance with the present invention, however, the camera back (not shown) has been removed from camera 10 and, film magazine 30 constructed in accordance with the present invention has been secured to hinge 37. Accordingly, film magazine 30 includes an outer body 31 defining a five-sided generally rectangular enclosure having an interior 40 and defining an outwardly extending front ridge 34. Body 31 further includes a viewer 32 having an eyepiece 33 supported upon the upper surface of outer body 31. A window 41, the function of which is set forth below in greater detail, is supported upon the upper surface of outer body 31. A groove 36 extends inwardly into ridge 34 and a seal 35 preferably formed of a resilient rubber material or the like and preferably having a circular cross section is received within groove 36. A hinge 42 is adapted to cooperate with hinge 37 and pivotally secure film magazine 30 to camera 10. In the position shown, film magazine 30 has been pivoted away from camera body 11 to permit description of some of the interior features of the present invention system. In its sealed configuration, however, as is better seen in FIG. 5, film magazine 30 is pivoted about hinge 37 to extend ridge 34 into camera body 11 such that seal 35 is compressively captivated between seal edge 38 and groove 36 and thereby seal both camera body 11 and film magazine for underwater use. It should be apparent to those skilled in the art that the closure of film magazine 30 to camera body 11 brings viewer 32 in line with viewer 13 such that eyepieces 33 and 19 are brought into alignment. As a result, the photographer continues to view the to-be-photographed scene through lens 12 via viewers 32 and 13.

Film magazine 30 further includes a film housing 50 which, as is described below in greater detail, defines a generally rectangular housing received within interior cavity 40 of outer body 31. In accordance with an important aspect of the present invention, film housing 50 is sized and shaped to be received within outer body 11 in a precision fit such that film housing 50 provides additional structural support for outer body 31 in the high pressure environment of underwater photography. Film housing 50 defines a front surface 51 which extends generally across interior 40 and which is recessed from ridge 34. Front face 51 further defines a pair of openings 52 and 53 proximate either end thereof which generally overlie film roll compartments 23 and 25 respectively of camera body 11 in the closed or sealed position. A film guide 60 having generally curved guide surfaces extends vertically adjacent to opening 52. A film guide 61 defining a generally planar curved member extends outwardly from opening 53. A sensing lever 54 is pivotally mounted within film housing 50 by means set forth below in greater detail and supports a pair of film rollers 55 and 56. In accordance with the pivotal mounting of sensing lever 54, rollers 55 and 56 are, by means set forth below in greater detail, capable of motion back and forth within opening 53 and take-up roll compartment 25 when film magazine 30 is sealingly mated to camera body 11. As is better seen in FIG. 2, a pair of film cannisters 70 and 71 are supported within film housing 50. A quantity of film 45 extends from cannister 70 to cannister 71 through opening 52 and opening 53 respectively. In accordance with an important aspect of the present invention, film 45 passes beneath pressure plate 24 and is received by the film transport means (not shown) within camera 10 in accordance with its conventional film transport operation. Film 45 passes over film guide 60 beneath pressure plate 24 and between film guide 61 and film rollers 55 and 56 to be received upon cannister 71. Thus as is set forth below in greater detail, film magazine 30 in accordance with an important aspect of the present invention receives and supports a pair of enlarged cannisters 70 and 71 having a substantially increased supply of film thereon. In further accordance with the present invention, film magazine 30 is configured to permit the film within cannister 70 to be transported through the film transport system of camera 10 in accordance with its normal operation to permit sequential photographing of a great number of film exposures. While various lengths of film may be wound upon film cannister 70 in the use of the present invention film magazine, it will be apparent to those skilled in the art that considerable advantage and economy is realized if cannisters 70 and 71 are sized to receive a full two hundred and fifty exposure quantity of film such as is commonly available in bulk form.

Figure 2:
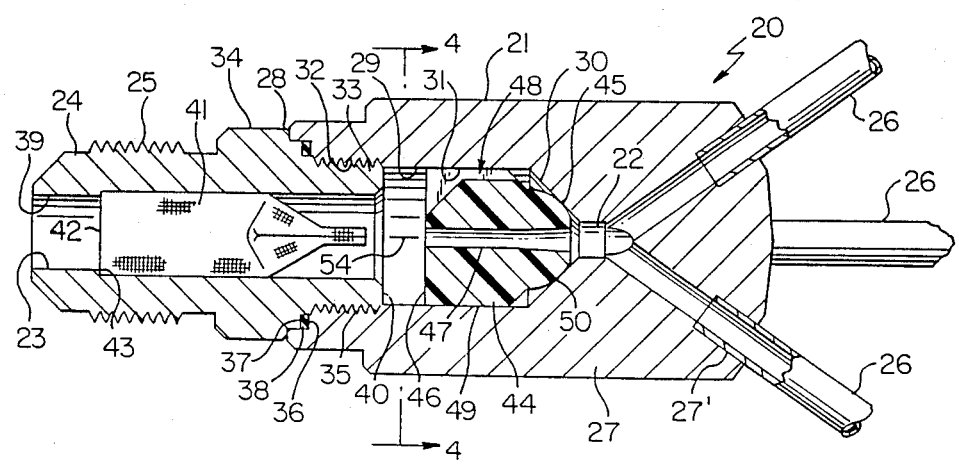
FIG. 2 sets forth a perspective view of the present invention film magazine loaded with film.

FIG. 2 sets forth a perspective view of film housing 50 removed from outer body 31. Film housing 50 includes a removable cover 62 having a generally planar configuration and defining an exposure counter window 63. As is set forth below in FIG. 6, cover 62 supports a film exposure counter mechanism 100 which provides a visible numeric indicator of the number of exposures taken during the operation of camera 10. Film housing 50 further defines an upwardly extending lip 90 and a pair of elongated openings 52 and 53. A pair of cylindrical cavities 72 and 73 are defined within film housing 50 and are coupled to openings 52 and 53 respectively. A pair of film cannisters 70 and 71 having generally cylindrical shapes are received within cavities 72 and 73 respectively. As described above, film 45 extends from cannister 70 through opening 52 outwardly from film housing 50 and thereafter returns through opening 53 to be received upon film cannister 71. Film housing 50 further defines a generally cylindrical cavity 75 which receives a motor 80, the operation of which is set forth below in greater detail. However, suffice it to note here that by gear means better seen in FIGS. 3 and 4, motor 80 is operative to drive film cannister 71 and thereby draw film 45 unto film cannister 71. Film housing 50 further defines a cavity 83 which supports a pair of batteries 81 and 82 which are used to power motor 80. A pair of generally cylindrical pins 64 and 65 extend upwardly from the top surface of film housing 50 and are received within corresponding recesses (not shown) within cover 62 to secure and locate cover 62 upon film housing 50. A switch 84 is supported near the upper surface of film housing 50 and defines a pair of switch contacts 85 and 86 which cooperate with exposure counter 100 (seen in FIG. 6) to increment the exposure count each time motor 80 is activated.

Figure 3:
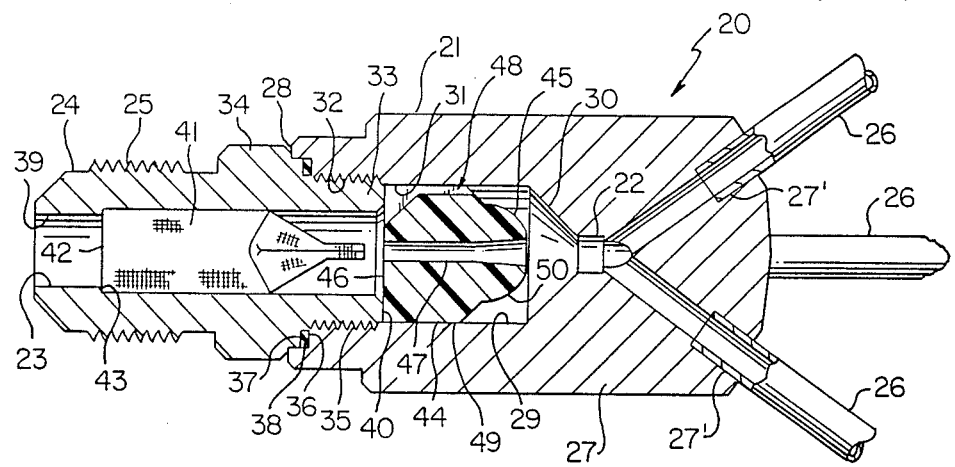
FIG. 3 sets forth a perspective view of the present invention film magazine having the film removed therefrom.

FIG. 3 sets forth a perspective view of film housing 50 with cover 62 removed and with film 45 and cannisters 70 and 71 similarly removed. Film housing 50 is formed of a pair of housing half portions 50A and 50B which permit electrical interconnections between the various components described herein. Film housing 50 defines a pair of cylindrical cavities 72 and 73 and a pair of openings 52 and 53 in communication therewith. Housing 50 further defines a cavity 83 supporting electrical contacts 91 and configured to receive batteries 81 and 82 (seen in FIG. 2). A pair of electrical contacts 85 and 86 extend from the upper surface of film housing 50 and provide electrical connections to switch 84 (seen in FIG. 5). A film guide 60 extends generally along the interior edge of opening 52 and provides a curved surface upon which film 45 may be drawn. A second curved guide 61 is supported upon housing 50 and defines a curved surface beneath which the film is drawn. A sensing lever 54 is pivotally supported within housing 50 and is movable within opening 53. Sensing lever 54 supports a pair of film rollers 55 and 56. Film housing 50 further defines a cylindrical cavity 75 which supports an electrical drive motor 80. Motor 80 further includes a drive shaft 92 which in turn supports a drive gear 93. An idler gear 94 is rotatably supported on the under surface of film housing 50 and is coupled to and engages drive gear 93. A spindle gear 95 is pivotally supported on the under surface of housing 50 while a spindle 97 adapted to engage cannister 71 (seen in FIG. 2) is supported within cavity 73. A spindle shaft 96 is coupled between spindle 97 and spindle gear 95. Spindle gear 95 engages and is driven by idler gear 94. Thus, activation of motor 80 produces rotation of drive gear 93 which in turn rotates idler gear 94 causing a rotation of spindle gear 95. The rotation of spindle gear 95 in turn causes a rotation of spindle 97. Thus, activation of motor 80 causes rotation of spindle 97 and draws film into cannister 71.

Figure 4:
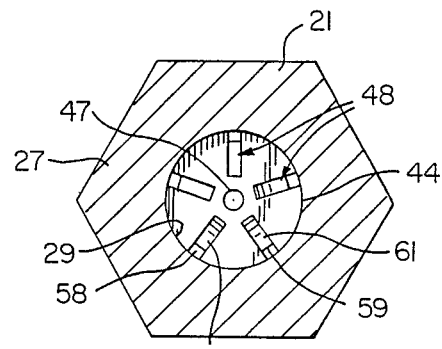
FIG. 4 sets forth a bottom perspective view of the present invention film magazine.

FIG. 4 sets forth a bottom view of film housing 50 showing the above-described coupling of drive gear 93, idler gear 94 and spindle gear 95. Accordingly, film housing 50 defines a bottom surface 57 which in turn defines an irregularly shaped recess 58 and a generally rectangular shaped recess 59. Drive gear 93 is supported within recess 58 and, as described above, is coupled to motor 80 by a shaft 92. Similarly, idler gear 94 is pivotally supported within recess 58 and engages drive gear 93. A spindle gear 95 which, as described above, is coupled to spindle 97 by a spindle shaft 96 is similarly supported within recess 58 of bottom surface 57. Spindle gear 95 engages idler gear 94. A plurality of electrical wires 101 are coupled to motor 80 and to a pair of connections 102 and 103 supported within recess 59. It should be understood that connections 102 and 103 provide appropriate electrical connections between the operative switching mechanisms and batteries 81 and 82 (seen in FIG. 2). Thus while not set forth herein in detail, it will be understood by those skilled in the art that motor 80 is electrically connected in the manner shown in FIG. 8 by conventional electrical connection systems.

Figure 5:
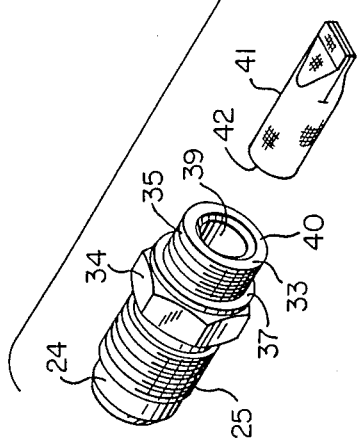
FIG. 5 sets forth a section view of the present invention film magazine taken along section lines 5—5 in FIG. 1.
Figure 5:
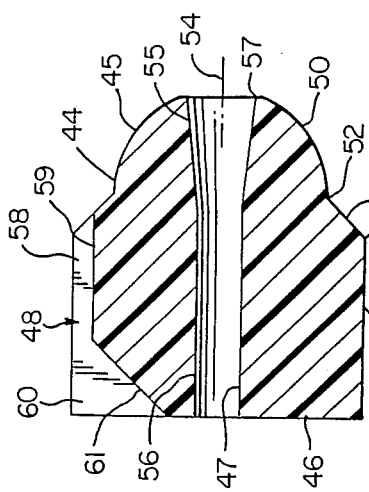

FIG. 5 sets forth a section view of film magazine 30 taken along section lines 5—5 in FIG. 1. Magazine 30 includes a five-sided outer body 31 supporting a seal rim 39 which in turn defines an outwardly extending ridge 34 and groove 36. A resilient seal 35 is received within groove 36 and provides the above-described sealing engagement of magazine 30 to camera 10. A film housing 50 is received within the interior of outer body 31 and defines a pair of cavities 72 and 73 having openings 52 and 53 respectively as described above. Film housing 50 further includes a cylindrical film guide 60 and a curved film guide 61. Film guide 61 is secured to film housing 50 by a fastener 66. As described above, camera 10 in accordance with conventional construction includes a conventional film transport mechanism which includes a sprocketed drive 104 and a pressure plate 124. A sensing lever 54 is pivotally secured to film housing 50 by a pivotal attachment 110 and extends into opening 53. As described above, sensing lever 54 supports a pair of film rollers 55 and 56. A spring 112 is supported within film housing 50 and is captivated therein by sensing lever 54 such that spring 112 urges sensing lever 54 toward camera 10. A switch 84 is operatively coupled to sensing lever 54 such that switch 84 is operated each time sensing lever 54 is moved toward camera 10. A second switch 111 is operatively coupled to sensing lever 54 and provides electrical closure each time sensing lever 54 moves toward camera 10. As described above, cannister 70 supports a supply of film 45 which extends outwardly through opening 52 around film guide 60 and behind pressure plate 24 of camera 10. Film 45 further extends around sprocketed drive gear 104 and passed rollers 55 and 56 through opening 53 and is received above cannister 71. In the position shown in FIG. 5, camera 10 is prepared to expose a portion of film 45. Once the exposure takes place, the photographer's operation of film advance lever 15 (seen in FIG. 1) causes a corresponding rotation of sprocketed drive 104 which in turn draws a portion of film 45 across pressure plate 24 and outwardly from cannister 70 until the exposed portion of film has been replaced beneath pressure plate 24 by the next unexposed frame of film. As sprocketed drive 104 rotates transporting film 45 to the right, the tension upon the portion of film 45 extending between sprocketed drive 104 and cannister 71 is relieved which in turn permits spring 112 to move sensing lever 54 toward camera 10. The motion of sensing lever 54 toward camera 10 causes the operation of switch 84 producing an increment signal (or film counter 100 incrementing the exposure count. In addition, the motion of sensing lever 54 also activates switch 111 which in accordance with the operation described in FIG. 8 causes the energizing of motor 80. The energizing of motor 80 in turn by the above-described coupling drives spindle 97 (seen in FIG. 3) which in turn rotates cannister 71 in the direction indicated by arrow 76 which draws the excess or slack portion of film 45 unto cannister 71. As cannister 71 is rotated by motor 80 in the direction indicated by arrow 76, film 45 is wound upon cannister 71 until sprocketed drive 104 ceases its rotation. Thereafter, the rotation of cannister 71 is continued until film 45 forces sensing lever 54 away from camera 10 causing switch 111 to open and interrupt the power applied to motor 80. With the power applied to motor 80 interrupted, the rotation of cannister 71 ceases and the system returns to the position shown in FIG. 5.

Thus, in accordance with an important aspect of the present invention, camera 10 operates its conventional film transporting system unimpeded by film magazine 30 while the film drive system of magazine 30 winds upon the exposed film upon cannister 71. The above process continues as successive exposures of film are carried out by the photographer. Each time the film within camera 10 is advanced, sprocketed drive 104 transports the film from beneath pressure plate 24 and the operation of sensing lever 54 and switch 111 cooperate to cause motor 80 to incrementally wind the exposed film upon cannister 71. This operation continues until all of the film wound upon cannister 70 has been exposed.

The reloading of the present invention system is accomplished by returning camera 10 to the surface and opening magazine 30 from camera 10 in the manner shown in FIG. 1. As magazine 30 is opened from camera 10, a safety switch 113 which includes a sensing pin 67 senses the camera opening and interrupts all power to motor 80. This prevents any accidental or unintentional operation of motor 80 with the camera open. With magazine 30 in the open position, film 45 may simply be rewound upon cannister 70 and removed from film housing 50 for processing.

Figure 6:
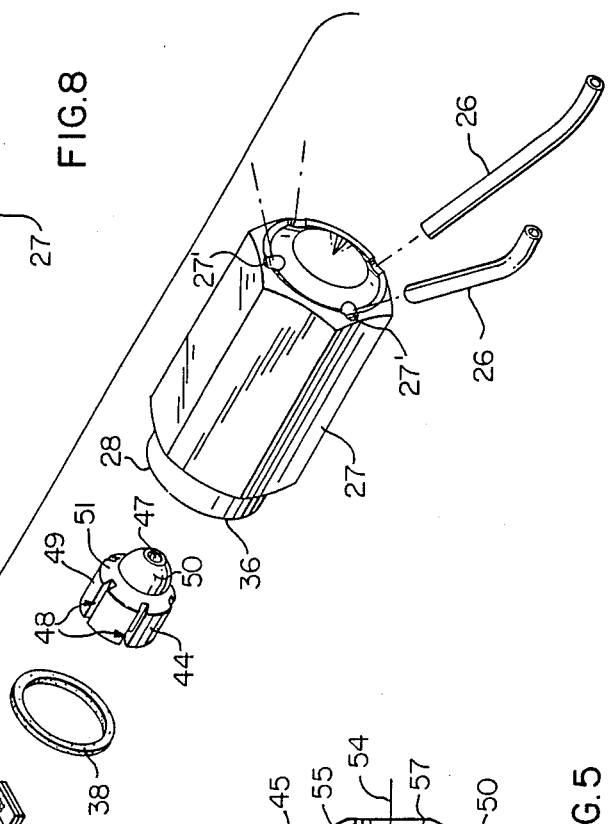
FIG. 6 sets forth a partial perspective view of the top portion of the present invention film magazine.

FIG. 6 sets forth a partially sectioned view of a portion of cover 62. As described above, cover 62 defines a window 63 and supports an exposure counter 100. In accordance with conventional fabrication techniques, exposure counter 100 includes a digital display 68 which is viewable through window 63. As described above, exposure counter 100 is coupled to switch 84 (seen in FIG. 5) and is operated in response thereto to increment the displayed number on display 68 each time motor 80 is activated and sensing lever 54 moves toward camera 10.

Figure 7:
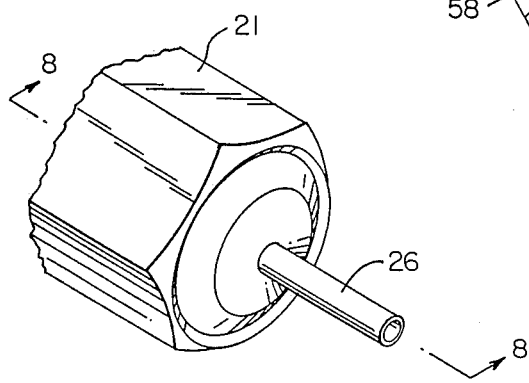
FIG. 7 sets forth a schematic diagram of the exposure counter of the present invention film magazine.

FIG. 7 shows a schematic diagram of exposure counter 100 together with switch 84. A battery 115 constructed in accordance with conventional fabrication techniques is supported within exposure counter 100 (seen in FIG. 6). While battery 115 may comprise any number of presently available batteries, it has been preferable to provide a pair of batteries 115 (seen in FIG. 6). In operation, the circuit of FIG. 7 is operated as switch 84 closes in response to the motion of sensing lever 54 which provides a pulse signal to exposure counter 100 causing display 68 to be incremented. It will be recognized by those skilled in the art that any number of configurations for exposure counter 100 may be utilized in cooperation with switch 84 and battery 115 to respond to the closure of switch 84 each time sensing lever 54 is operated and to display a numeric count in accordance therewith.

Figure 8:
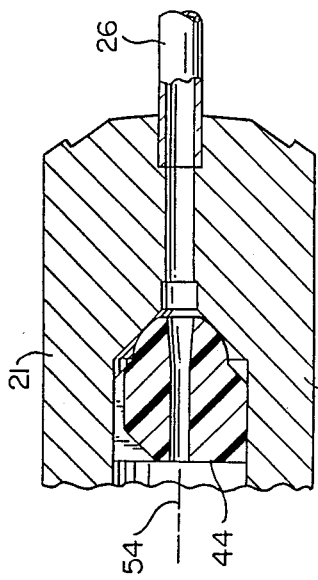
FIG. 8 sets forth a schematic diagram of the motor control system for the present invention film magazine.

FIG. 8 sets forth a schematic diagram of the motor control circuit of the present invention system. An NPN transistor 120 includes an emitter electrode 121, a base electrode 122 and a collector electrode 123. A battery supply comprising batteries 81 and 82 defines a positive terminal 126 and a negative terminal 127. A motor 180 is coupled between negative terminal 127 and emitter electrode 121. A safety switch 113 is coupled between positive terminal 126 of batteries 81 and 82 and collector electrode 123 of transistor 120. A resistor 125 is coupled between base electrode 122 and motor 80. The series combination of a switch 84 and a resistor 124 are coupled between switch 113 and base 122.

In operation, safety switch 113 is closed so long as magazine 30 is secured to camera 10. With closure of safety switch 113, transistor 120 remains inoperative so long as switch 84 is in the open position. As described above in connection with FIG. 5, switch 84 remains in the open or nonconducting position so long as sensing lever 54 has not pivoted toward camera 10. Thus, with switch 84 open, motor 80 is unpowered and no film motion or winding takes place. Once film is advanced within camera 10 and the above-described motion of sensing lever 54 toward camera 10 takes place, switch 84 is closed applying a forward bias voltage to base 122 of transistor 120 causing it to conduct. The conduction of transistor 120 in turn couples operating power to motor 80 causing it to be energized which in turn provides the above-described winding of film upon cannister 71 (seen in FIG. 5). Once the motion of film within camera 10 ceases at the completion of the film advance, sensing lever 54 is again moved away from camera 10 and switch 84 opens. With the opening of switch 84, the forward bias on base 122 is removed which in turn causes transistor 120 to cease conducting thereby interrupting the operation of motor 80.

What has been shown is a convenient, easy to use and improved film magazine for underwater cameras. It will be apparent to those skilled in the art that while the present invention film magazine has been shown in combination with a typical underwater thirty-five millimeter camera, the system may be applied to virtually any format of camera. It will be further apparent to those skilled in the art that while the present system enjoys its maximum advantage in cooperation with underwater cameras, it provides extended film magazine capacity in combination with cameras not specifically adapted or limited to use underwater.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. For use in combination with a camera having means for exposing film and film transport means for advancing film between exposures, a film magazine comprising:

an outer housing having attachment means for attachment to the camera and sealing means for forming a seal therewith;

a film housing configured to be received within said outer housing and defining first and second of cavities;

first and second film cannisters supported within said first and second cavities respectively;

motor drive means coupled to said second film cannister for causing rotation thereof such that a quantity of film may be wound upon said first cannister and transferred to said second cannister through the film transport means of the camera; and sensing means coupled to said motor drive means for detecting the advance of the film and operating said motor drive means to transfer a portion of the film to said second cannister.

2. A film magazine as set forth in claim 1 wherein said sensing means includes a pivotally supported lever having a pair of rollers contacting the film and a spring urging said lever so as to press said rollers against said film.

3. A film magazine as set forth in claim 2 wherein said sensing means include a first switch operated by said lever and wherein said motor drive means respond to said first switch.

4. A film magazine as set forth in claim 3 further including a film exposure counter having a numeric display and second switch operated by said lever for incrementing said numeric display.

5. A film magazine as set forth in claim 4 wherein said film housing cooperates with said outer housing to provide reinforcement and strengthening thereof.

6. A film magazine as set forth in claim 5 wherein the camera includes a viewer eyepiece and wherein said outer housing includes optical means coupled to said viewer eyepiece.

7. A film magazine as set forth in claim 6 wherein said motor drive means include a safety switch for disabling said motor in the event said magazine is removed from the camera.

* * * * *